US012783123B2

(12) United States Patent
Jang

(10) Patent No.: US 12,783,123 B2
(45) Date of Patent: Nov. 3, 2026

(54) STORAGE APPARATUS AND OPERATING METHOD THEREOF

(71) Applicant: SK hynix Inc., Icheon-si (KR)

(72) Inventor: In Jong Jang, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 13 days.

(21) Appl. No.: 18/646,487

(22) Filed: Apr. 25, 2024

(65) Prior Publication Data

US 2025/0190111 A1 Jun. 12, 2025

(30) Foreign Application Priority Data

Dec. 7, 2023 (KR) ........................ 10-2023-0176557

(51) Int. Cl.
*G06F 3/06* (2006.01)

(52) U.S. Cl.
CPC ............ *G06F 3/061* (2013.01); *G06F 3/0659* (2013.01); *G06F 3/0673* (2013.01)

(58) Field of Classification Search
CPC ...... G06F 3/061; G06F 3/0659; G06F 3/0673; G06F 3/0679
See application file for complete search history.

(56) References Cited

U.S. PATENT DOCUMENTS

| | | | | |
|---|---|---|---|---|
| 5,530,871 | A * | 6/1996 | Abe | G06F 3/0613 710/240 |
| 10,157,096 | B2 | 12/2018 | Cai et al. | |
| 2020/0333958 | A1* | 10/2020 | Lee | G06F 3/0652 |
| 2020/0363991 | A1* | 11/2020 | Lee | G06F 3/0673 |
| 2024/0411677 | A1* | 12/2024 | Bryson | G06F 12/0246 |
| 2025/0139000 | A1* | 5/2025 | Jo | G06F 3/0644 |

FOREIGN PATENT DOCUMENTS

| | | | |
|---|---|---|---|
| KR | 1020100030992 | A | 3/2010 |
| KR | 1020210003625 | A | 7/2021 |

* cited by examiner

*Primary Examiner* — Yong J Choe

(57) ABSTRACT

A storage apparatus includes a memory device including a first memory block and a second memory block and a storage controller configured to control the memory device. The storage controller is configured to determine, when first read data read-requested by an external apparatus is read from the first memory block, an attribute of the first read data set by the external apparatus and copy the first read data having a first attribute to the second memory block.

12 Claims, 7 Drawing Sheets

FIG. 2

| Byte \ Bit | 7 | 6 | 5 | 4 | 3 | 2 | 1 | 0 |
|---|---|---|---|---|---|---|---|---|
| 0 | OPERATION CODE (2Ah) | | | | | | | |
| 1 | WRPROTECT = 000b | | | DPO | FUA | Reserved | FUA_NV = 0b | Obsolete |
| 2 | (MSB) | LOGICAL BLOCK ADDRESS | | | | | | |
| 3 | | | | | | | | |
| 4 | | | | | | | | |
| 5 | | | | | | | | (LSB) |
| 6 | Reserved | | | GROUP NUMBER | | | | |
| 7 | (MSB) | TRANSFER LENGTH | | | | | | |
| 8 | | | | | | | | (LSB) |
| 9 | CONTROL = 00h | | | | | | | |

STORAGE APPARATUS AND OPERATING METHOD THEREOF

CROSS-REFERENCE TO RELATED APPLICATION

The present application claims priority under 35 U.S.C. § 119 (a) to Korean Patent Application Number 10-2023-0176557, filed on Dec. 7, 2023, in the Korean Intellectual Property Office, which is incorporated herein by reference in its entirety.

BACKGROUND

1. Technical Field

Various embodiments generally relate to a semiconductor integrated apparatus, and more particularly, to a storage apparatus and an operating method thereof.

2. Related Art

Storage apparatuses may use volatile memory devices and/or nonvolatile memory devices as storage media, and may be coupled to external apparatuses and perform data input/output operations according to requests of the external apparatuses.

When a specific region of a memory device is repeatedly accessed, read disturbances may occur.

To address read disturbance occurrences, data may be refreshed through a reclaim operation that moves data of a memory region, which is accessed a predetermined number of times, to another memory region.

There is a need for a method for managing reclamation of target data so that internal reclaim operations performed in the storage apparatus do not interfere with requests of the external apparatuses.

SUMMARY

Embodiments are directed to a storage apparatus capable of managing frequently accessed data, and an operating method thereof.

In an embodiment of the present disclosure, a storage apparatus may include: a memory device including a first memory block and a second memory block; and a storage controller configured to control the memory device. The storage controller may be configured to determine, when a first read data is requested by an external apparatus and is read from the first memory block, an attribute of the first read data set by the external apparatus and to copy the first read data having a first attribute to the second memory block.

In an embodiment of the present disclosure, a storage apparatus may include: a memory device including a first memory block and a second memory block; and a storage controller configured to control the memory device. The storage controller may be configured to store data having a first attribute in the second memory block according to a read request of an external apparatus, based on a data attribute set by the external apparatus.

In an embodiment of the present disclosure, an operating method of a storage apparatus that includes a storage controller configured to control a memory device including a first memory block and a second memory block, the method may include: the storage controller reading a first read data requested by an external apparatus from the first memory block; the storage controller determining an attribute of the first read data set by the external apparatus; and the storage controller copying, when the first read data has a first attribute, the first read data to the second memory block.

According to the present technology, collection of data of high access frequency is facilitated.

The collected access-intensive data may be refreshed together, and thus performance of a storage apparatus may be improved.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which:

FIG. 2 is a diagram illustrating a configuration of a data packet transmitted to a storage apparatus according to an embodiment of the present disclosure;

DETAILED DESCRIPTION

Various embodiments of the present teachings are described in detail with reference to the accompanying drawings. The drawings are schematic illustrations of various embodiments (and intermediate structures). As such, variations from the configurations and shapes of the illustrations as a result, for example, of manufacturing techniques and/or tolerances, are to be expected. Thus, the described embodiments should not be construed as being limited to the particular configurations and shapes illustrated herein but may include deviations in configurations and shapes which do not depart from the spirit and scope of the present teachings as defined in the appended claims.

The present teachings are described herein with reference to cross-section and/or plan illustrations of idealized embodiments of the present teachings. However, embodiments of the present teachings should not be construed as limiting the present teachings. Although a few embodiments of the present teachings are shown and described, it will be appreciated by those of ordinary skill in the art that changes may be made in these embodiments without departing from the principles and spirit of the present teachings.

Figure 1:
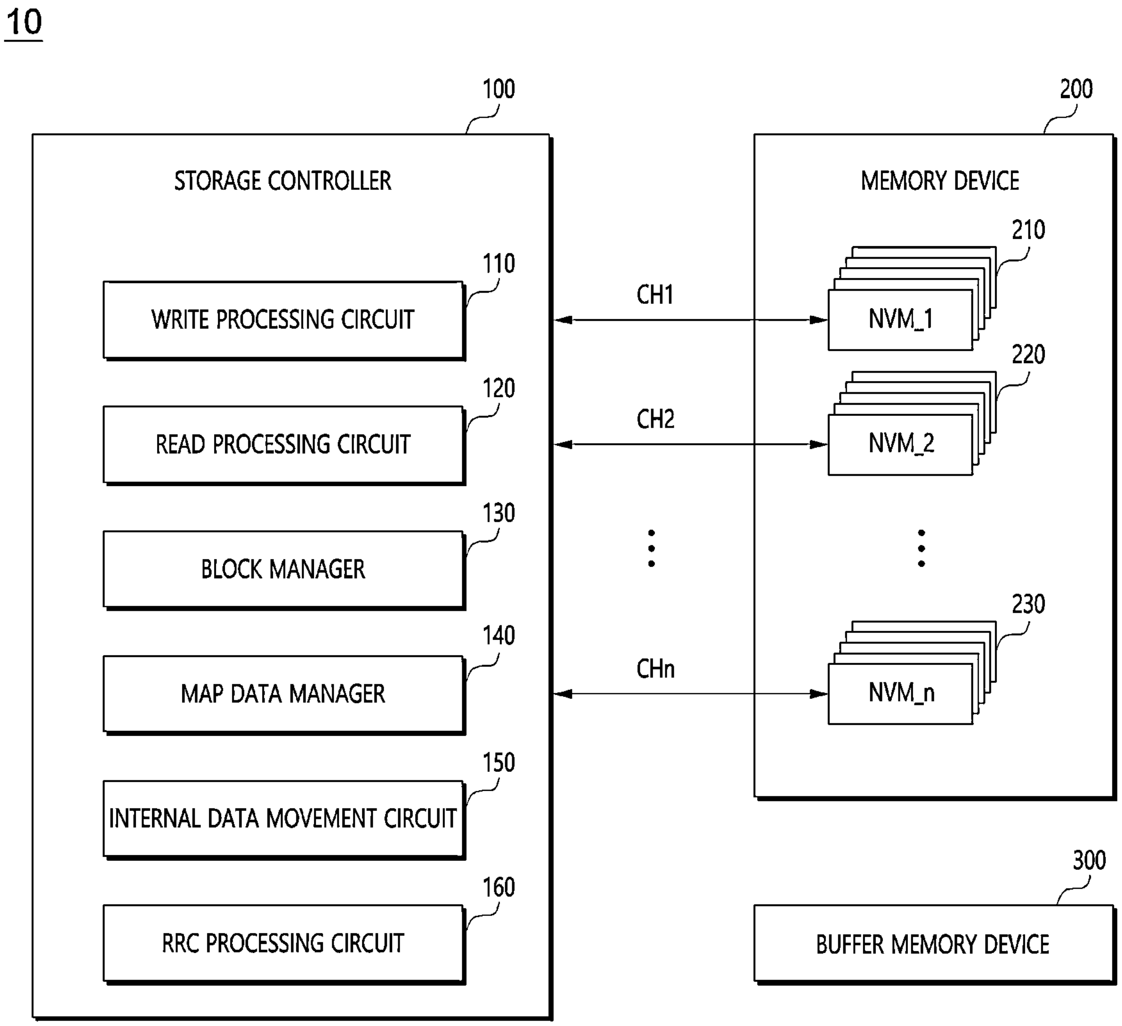
FIG. 1 is a diagram illustrating a configuration of a storage apparatus according to an embodiment of the present disclosure.

FIG. 1 is a diagram illustrating a configuration of a storage apparatus according to an embodiment of the present disclosure.

Referring to FIG. 1, a storage apparatus 10 may be configured to process a request of an external apparatus. The storage apparatus may include a storage controller 100, a memory device 200, and a buffer memory device 300. The memory device 200 may include a plurality of nonvolatile memory devices (NVMs) 210, 220, and 230.

The memory device 200 may include a certain number of dies, and each of the dies may include a certain number of planes. Each of the planes may include a plurality of memory blocks, and each of the plurality of memory blocks may be configured with a plurality of pages. The memory device 200 may transmit/receive data to/from the storage controller 100 through channels CH1 to CHn.

The external apparatus (not illustrated) may include at least one processor. The external apparatus may be a processor itself or may be an electronic apparatus or an electronic system including a processor.

The external apparatus may transmit a write request including a write command, an address, and write data to the storage apparatus 10 to write data. In response to the request, the storage apparatus 10 may control the memory device 200 to program the write data.

The external apparatus may transmit a read request including a read command and an address to the storage apparatus 10 to read data. The storage apparatus 10 may read read-requested data from the memory device 200 and transmit the read data to the external apparatus. To perform the write request and the read request of the external apparatus, as well as to perform an internal operation of the storage apparatus 10, the storage apparatus 10 may read data from one region of the memory device 200 and store the read data in another region of the memory device 200. The internal operation may include a house-keeping operation, for example, garbage collection, wear-leveling, and the like.

The buffer memory device 300 may temporarily store data transmitted and received between the external apparatus and the storage apparatus 10 in a read or write operation or data input and output through the internal operation.

In an embodiment, the storage controller 100 may include a write processing circuit 110, a read processing circuit 120, a block manager 130, a map data manager 140, and an internal data movement circuit 150, and a read reclaim (RRC) processing circuit 160.

The write processing circuit 110 may receive the write request including the write data from the external apparatus and control the memory device 200 to program the write data.

The read processing circuit 120 may control the memory device 200 to read data read-requested by the external apparatus and provide the read data to the external apparatus.

The block manager 130 may manage a plurality of memory blocks constituting the memory device 200. For example, the block manager 130 may perform block open for processing the write request, block close for a block in which data are saturated, and manage a block list for blocks in an open or closed state.

The map data manager 140 may be configured to generate, update, and invalidate map data, which maps a logical address used by the external apparatus and a physical address used by the memory device 200. For example, the map data manager 140 may generate map data to program the write-requested data in the memory device 200. When a physical location of the data stored in the memory device 200 is changed, the map data manager 140 may update the map data. The map data manager 140 may invalidate old map data referring to a location in the memory device is changed, and may invalidate map data of data that is deleted in the memory device 200.

The internal data movement circuit 150 may move (i.e., copy) data read from the one region of the memory device 200 to another region of the memory device 200 to perform house-keeping operations.

The RRC processing circuit 160 may provide a victim block number and a target block number, which are used in reclaim operations, to the internal data movement circuit 150 and may control data to be moved from a victim block to a target block when a read reclaim event is triggered based on preset criteria. Accordingly, the internal data movement circuit 150 may copy data of the victim block to the target block.

FIG. 2 is a diagram illustrating a configuration of a data packet transmitted to a storage apparatus according to an embodiment of the present disclosure.

In an embodiment, a storage apparatus 10 may perform communication with an external apparatus according to a universal flash storage (UFS) interface protocol.

FIG. 2 illustrates a configuration of a UFS protocol information unit (UPIU) (hereinafter, referred to as 'data packet'), which is transmitted from the external apparatus to the storage apparatus 10 in accordance with a UFS interface communication method.

Referring to FIG. 2, the UFS interface-based data packet UPIU may include a reserved area Reserved in partial bits of a sixth-byte size.

The external apparatus may include an attribute of data to be written or read in the reserved area Reserved and transmit the data packet including the attribute of the data to the storage apparatus 10.

In an embodiment, the attribute of the data may be set as a flag bit. For example, when the flag of the reserved area Reserved is at a high level, such as logic 1, the corresponding data may be data that is frequently read.

In an embodiment, an attribute of the data may be set as an extension of the corresponding data. For example, an extension, which distinguishes whether the data to be written or read is multimedia data (i.e., music/moving image/photo data), game application-related data, document/memo data, system data, or backup data, may be included in the reserved area Reserved.

The storage controller 100 may determine an attribute of the read-requested data or the write-requested data through setting a value of the reserved area Reserved and processing the write request or the read request according to the attribute of the data.

Figure 3:
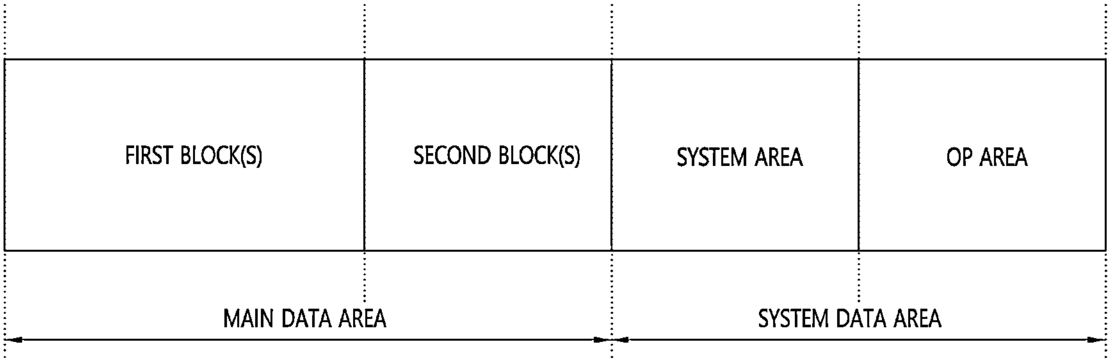
FIG. 3 is a diagram illustrating a logical configuration of a memory device according to an embodiment of the present disclosure.

FIG. 3 is a diagram illustrating a logical configuration of a memory device according to an embodiment of the present disclosure.

Referring to FIG. 3, a memory device 200 may be divided into a main data area MAIN DATA AREA and a system data area SYSTEM DATA AREA according to a kind of data to be stored.

Data that is write-requested by the external apparatus may be stored in the main data area. The main data area may be divided into a first block and a second block. The second block may be a space in which first data, having a specific first attribute among the data write-requested by the external apparatus, are collected and stored.

The system data area may be divided into a system area in which system information is stored and an over provisioning area (OP area) required for maintaining operational performance of the storage apparatus.

The system information stored in the system area may include map data for mapping information between a logical address and a physical address, information required for a booting operation of a storage apparatus 10, settings information used for firmware driving and execution of a storage controller 100, and the like.

The OP area may be a space allocated for various functions required to drive the storage apparatus 10, such as wear-leveling, garbage collection, bad block management, and the like.

In an embodiment, the storage controller 100 may control the write-requested data to be programmed in the first block. When the read-requested data has a first attribute, the storage controller 100 may move the read data to the second block.

When the data having a frequently-read attribute are collected in the second block, the second block may be disturbed. The storage controller 100 may monitor the access count of the second block, such as the read count of the second block. When the second block is accessed a certain number of times or more, the storage controller 100 may select the second block as a victim block of the reclaim operation.

Figure 4:
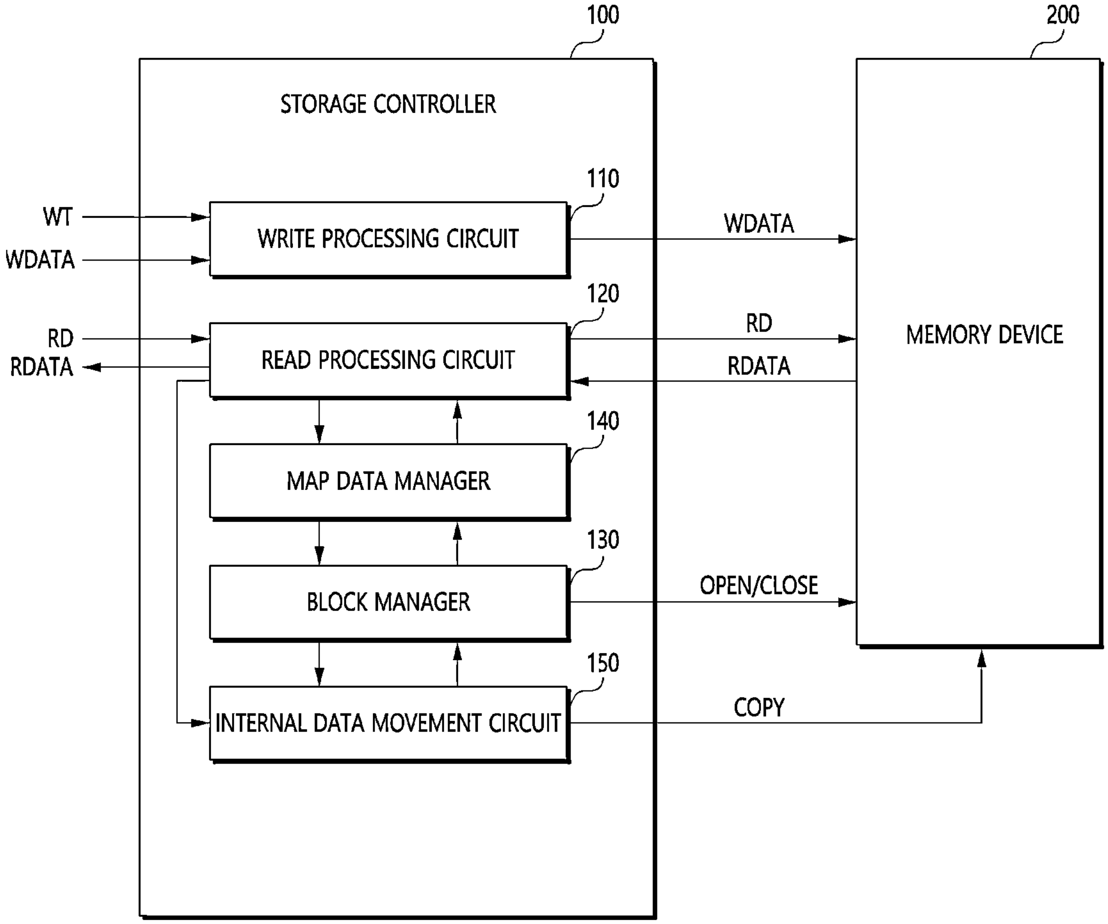
FIG. 4 is a diagram illustrating a configuration of a storage controller according to an embodiment of the present disclosure.

FIG. 4 is a diagram illustrating a configuration of a storage controller according to an embodiment of the present disclosure.

Referring to FIG. 4, a write processing circuit 110 may control a memory device 200 to program write data WDATA in response to a write request WT.

When an external apparatus and the storage apparatus 10 communicate with each other according to a UFS interface, the write request WT may be transmitted through the data packet as shown in FIG. 2. The write processing circuit 110 may extract an attribute of the write data WDATA, which is transmitted with the write request, from the reserved area Reserved of the data packet, and manage the attribute of the write data as meta data of the write data WDATA.

A read processing circuit 120 may acquire a physical address from a map data manager 140 in response to a read request RD of the external apparatus and transmit a read command RD to the memory device 200 according to the acquired physical address. The data RDATA read from the memory device 200 according to the read command RD may be transmitted to the external apparatus.

When the external apparatus and the storage apparatus 10 communicate with each other through the UFS interface, the write request may be transmitted using the data packet configuration shown in FIG. 2.

When the read-requested data in the second block is accessed, the map data manager 140 may inform a block manager 130 of the access to the second block.

The block manager 130 may increase the access count to the second block when the read-requested data is stored in the second block. The block manager 130 may allow the corresponding second block to be transitioned from an open state to a closed state when the access count to the second block exceeds a threshold value.

When the read-requested data exists in the first block, the read processing circuit 120 may determine an attribute of the read-requested data. In an embodiment, the read processing circuit 120 may determine the attribute of the read-requested data with reference to the reserved area Reserved of the data packet included in the read request of the external apparatus or in the meta data of the read-requested data.

The read processing circuit 120 may request data movement to an internal data movement circuit 150 when the read-requested data has a first attribute.

The internal data movement circuit 150 may copy the read-requested data from the first block to the second block in response to a movement request of the read processing circuit 120.

As the internal data movement circuit 150 copies the data, the map data manager 140 may update the map data. Further, the block manager 130 may determine whether or not the second block is saturated, and may transition the second block from an open state to a closed state when the second block is saturated.

Figure 5:
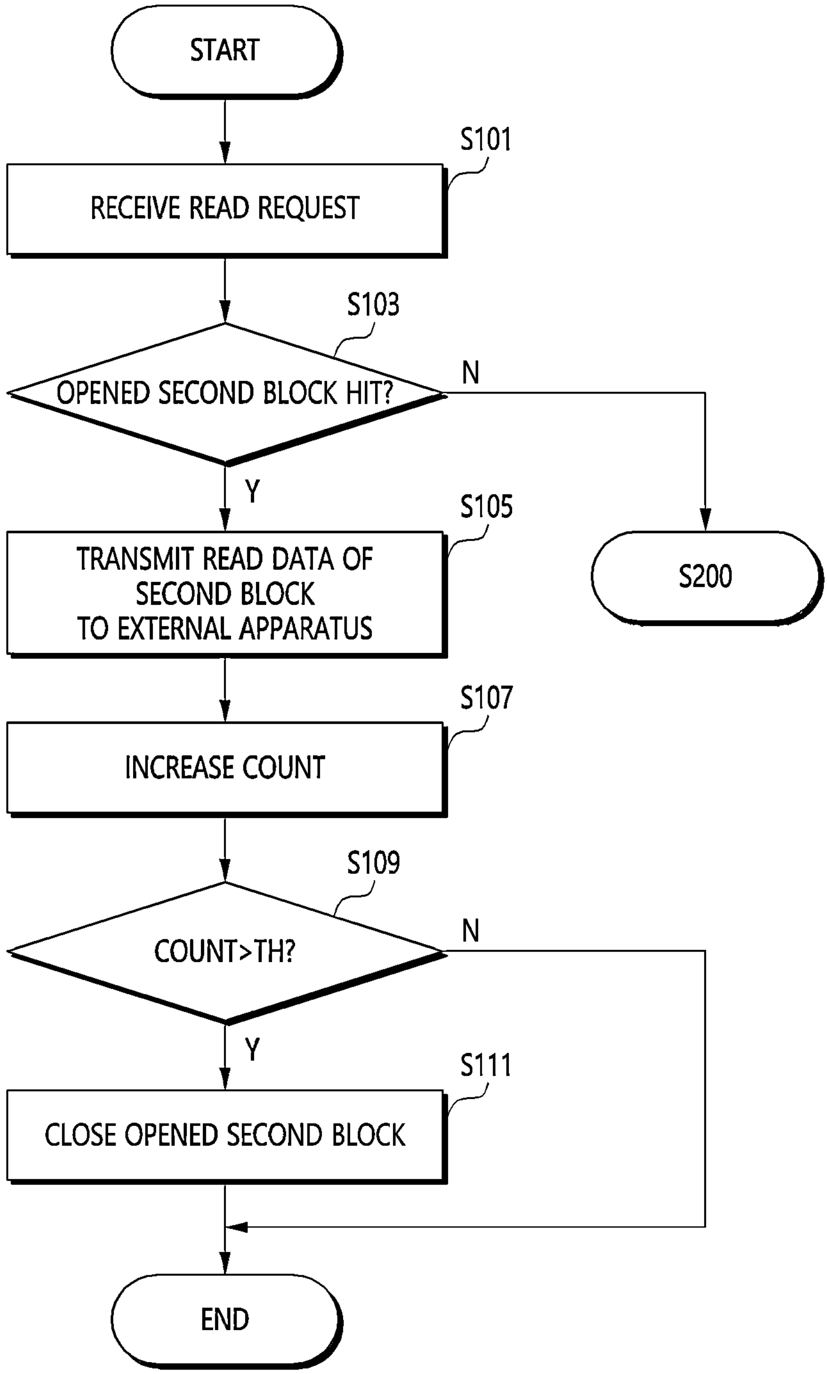
FIGS. 5 and 6 are flowcharts illustrating operating methods of a storage apparatus according to embodiments of the present disclosure.
Figure 6:
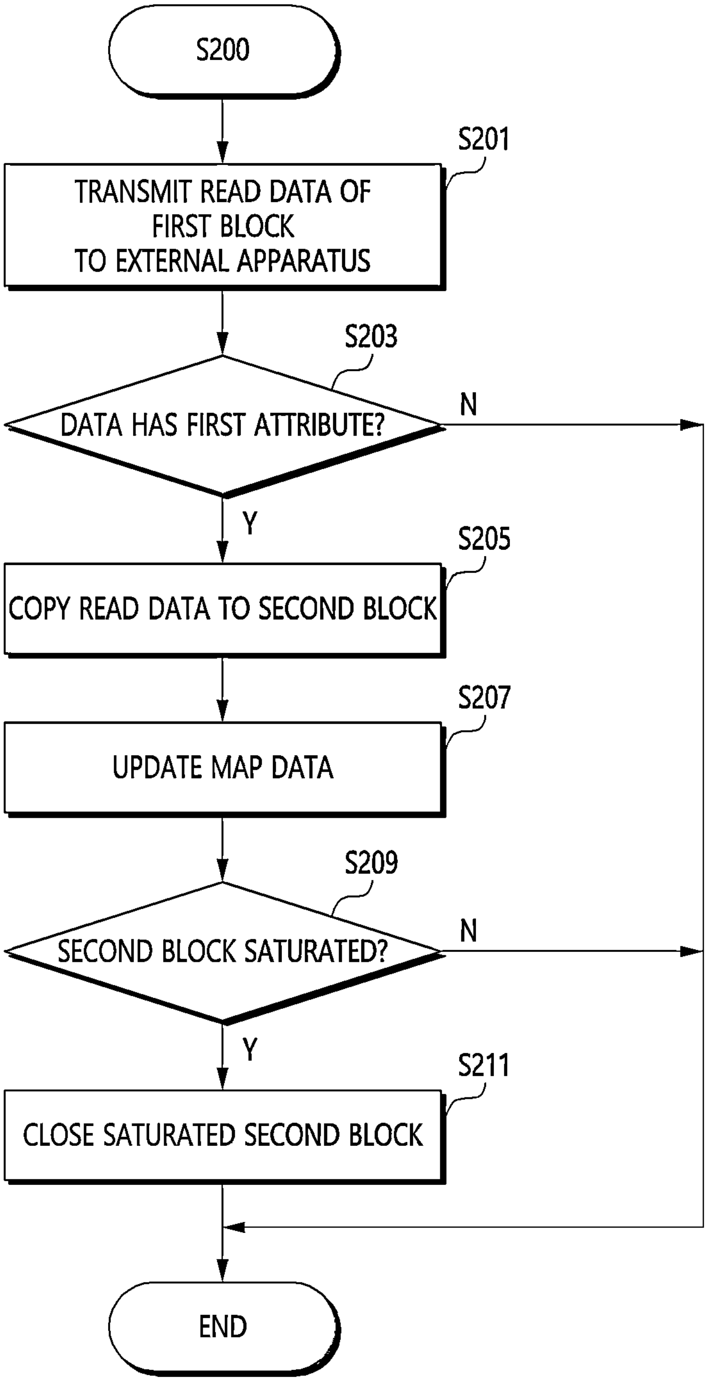

FIGS. 5 and 6 are flowcharts illustrating operating methods of a storage apparatus according to embodiments of the present disclosure.

Referring to FIG. 5, as a read request is received from an external apparatus (S101), a storage controller 100 may determine, using the physical address of the read-requested data, whether read-requested data is in a second block and in an open state (S103).

When the read-requested data exists (i.e., hit) in the second block (S103:Y), the storage controller 100 may transmit the data read from the second block to the external apparatus (S105).

A storage controller 100 may increase the access count of the second block (S107), and determine whether or not the access counter exceeds a threshold value TH (S109).

When the access count to the second block exceeds the threshold value TH (S109: Y), the storage controller 100 may allow the corresponding second block to be changed from an open state to a closed state (S111).

When the access count to the second block is less than the threshold value TH (S109:N), the storage controller 100 may terminate the read operation.

When the read-requested data does not exist in the second block (S103:N), the storage controller 100 may perform a process S200, illustrated in the FIG. 6.

Referring to FIG. 6, the storage controller 100 may transmit the data read from a first block to the external apparatus (S201).

The storage controller 100 may determine an attribute of the read-requested data (S203).

When the external apparatus and a storage apparatus 10 communicate with each other through a UFS interface, read requests and write requests may be transmitted using the data packet configuration illustrated in FIG. 2. Accordingly, the storage controller 100 may determine the attribute of the read-requested data from the reserved area Reserved of the data packet included in the read request of the external apparatus or from the meta data of the read-requested data.

When the read-requested data has a first attribute (S203: Y), the storage controller 100 may copy the read-requested data from a first block to a second block (S205).

As the data is internally moved, the storage controller 100 may update the corresponding map data (S207). Further, the storage controller 100 may determine whether or not the second block is saturated (S209).

When the second block is saturated (S209:Y), the storage controller 100 may change the saturated second block to a closed state (S211).

When the read-requested data does not have the first attribute (S203:N) or when the second block is not saturated (S209:N), the read processing may be terminated.

As described above, in the process of processing the read-requested data, the data having a first attribute may be collected in the second block.

Figure 7:
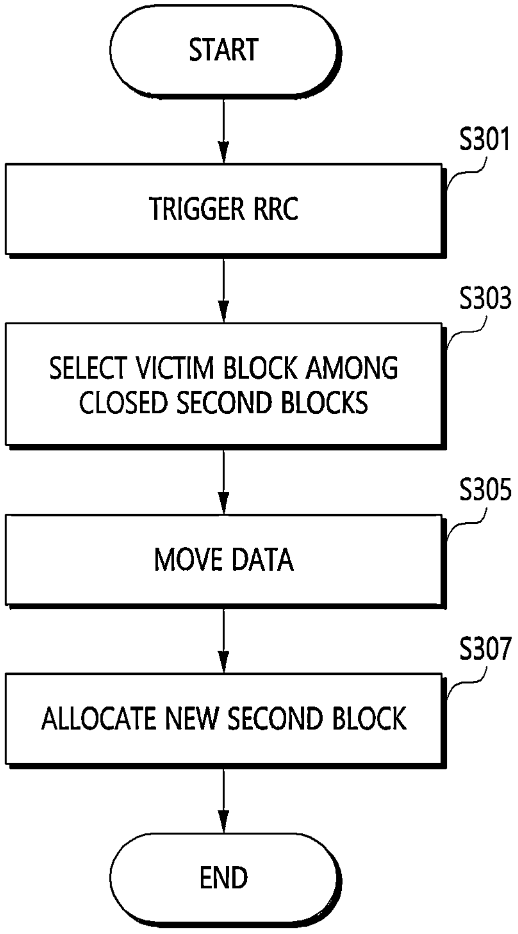
FIG. 7 is a flowchart explaining an operating method of a storage apparatus according to an embodiment of the present disclosure.

FIG. 7 is a flowchart explaining an operation method of a storage apparatus according to an embodiment of the present disclosure.

Referring to FIG. 7, a read reclaim (RRC) operation may be triggered according to a preset condition (S301). For example, the read reclaim (RRC) operation may be triggered at preset intervals or may be triggered according to various conditions such as the access count for a memory block.

When the read reclaim operation is triggered, the storage controller 100 may select a number of second blocks, from among all of the second blocks, that are in a closed state as victim blocks (S303).

The storage controller 100 may select a number of first blocks, from among all of the first blocks, as target blocks and move the data of the victim blocks to the target blocks (S305).

The storage controller 100 may allocate new second blocks to store data having a first attribute (S307).

When data having a first attribute (i.e., a read-intensive attribute) are collected in the second block, the second block may be vulnerable to disturbances.

Accordingly, the data of the second block in which the read-intensive data are collected may be selected as a candidate for a reclaim operation, and thus the data may be secured and protected.

The above described embodiments of the present invention are intended to illustrate and not to limit the present invention. Various alternatives and equivalents are possible. The invention is not limited by the embodiments described herein. Nor is the invention limited to any specific type of semiconductor device. Other additions, subtractions, or modifications are obvious in view of the present disclosure and are intended to fall within the scope of the appended claims.

What is claimed is:

1. A storage apparatus comprising:

a memory device including a first memory block and a second memory block; and a storage controller configured to control the memory device, wherein the storage controller is configured to program write-requested data by an external apparatus in the first memory block and to determine, when a first read data is requested by the external apparatus and is read from the first memory block, an attribute of the first read data set by the external apparatus and to copy the first read data to the second memory block, in response to determining that the first read data has a first attribute set by the external apparatus as a result of the determination of the attribute.

2. The storage apparatus of claim 1, wherein the storage controller is configured to increase an access count to the second memory block, when a second read data is requested by the external apparatus and is read from the second memory block.

3. The storage apparatus of claim 1, wherein the storage controller is configured to copy data of at least one second memory block in a closed state to the first memory block when a read reclaim operation is triggered.

4. The storage apparatus of claim 3, wherein the storage controller is configured to change the second memory block to a closed state when the second memory block reaches data saturation or when the second memory block has an access count that exceeds a threshold value.

5. The storage apparatus of claim 1, wherein the storage controller communicates with the external apparatus through a universal flash storage (UFS) interface protocol, and the attribute is included in a data packet in which the external apparatus transmits a request to the storage controller.

6. The storage apparatus of claim 5, wherein the attribute is included in a reserved area of the data packet.

7. An operating method of a storage apparatus that includes a storage controller configured to control a memory device including a first memory block and a second memory block, the method comprising:

programming, by the storage controller, write-requested data by an external apparatus in the first memory block, reading, by the storage controller, a first read data requested by the external apparatus from the first memory block;

determining, by the storage controller, an attribute of the first read data set by the external apparatus; and copying, by the storage controller, the first read data to the second memory block, in response to determining that the first read data has a first attribute set by the external apparatus as a result of the determination of the attribute.

8. The method of claim 7, further comprising:

reading, by the storage controller, a second read data requested by the external apparatus from the second memory block; and increasing, by the storage controller, an access count to the second memory block.

9. The method of claim 7, further comprising copying, by the storage controller, data of at least one second memory block, transitioned from an open state to a close state, to the first memory block, as a read reclaim operation is triggered.

10. The method of claim 9, further comprising transitioning, by the storage controller, the second memory block to the close state when data are saturated or access count exceeds a threshold value.

11. The method of claim 7, wherein the storage controller communicates with the external apparatus through a universal flash storage (UFS) interface protocol, and the attribute is included in a data packet in which the external apparatus transmits a write request or a read request to the storage controller.

12. The method of claim 11, wherein the attribute is included in a reserved area of the data packet.

* * * * *